United States Patent [19]

Moteki et al.

[11] Patent Number: 4,540,992

[45] Date of Patent: Sep. 10, 1985

[54] THERMAL COLOR TRANSFER SYSTEM

[75] Inventors: Murato Moteki; Yoshio Shimada; Fumihiro Tanaka; Fumio Watanabe; Kazuyuki Komatsu, all of Tokyo, Japan

[73] Assignee: Kabushiki Kaisha Daini Seikosha, Tokyo, Japan

[21] Appl. No.: 482,953

[22] Filed: Apr. 7, 1983

[51] Int. Cl.$^3$ .................... G01D 15/10; G03G 15/01; B41J 31/02

[52] U.S. Cl. ................................ 346/76 PH; 355/4; 400/120; 346/134

[58] Field of Search .................... 346/46, 76 PH, 134; 400/120; 355/4

[56] References Cited

U.S. PATENT DOCUMENTS 4,408,212 10/1983 Moriguchi et al. ............ 346/76 PH

FOREIGN PATENT DOCUMENTS 1520404 9/1978 United Kingdom .................... 355/4

*Primary Examiner*—E. A. Goldberg
*Assistant Examiner*—Gerald E. Preston
*Attorney, Agent, or Firm*—Robert E. Burns; Emmanuel J. Lobato; Bruce L. Adams

[57] ABSTRACT

A multicolored thermal transfer copying system needs an ink film having more than three colors successively. The accurate copying is performed by driving the plural platens via one metal roller, when plural thermal heads are used for transferring each color from the ink film.

8 Claims, 1 Drawing Figure

THERMAL COLOR TRANSFER SYSTEM

BACKGROUND OF THE INVENTION

This invention relates to a multicolor thermal transfer copying system, and more particularly to a multicolor thermal transfer copying system having a paper feeding mechanism which avoids color shear in printing.

For example, a multicolor thermal transfer copying system is used for the purpose of obtaining a hard color copy from a picture information of a figure etc. which is indicated in a Braun tube display of many kinds of devices. A copying system of this type has yellow, magenta, cyan and black thermal head members arranged along the feeding route of the copying paper which is fed at a constant speed. When the copying paper passes through each thermal head member, a heat current for transferring is supplied to the thermal head which is in pressure contact with the copying paper via the ink ribbon, whereby a desired color ink which is coated on the ink ribbon is transferred to the copying paper to obtain a multicolor picture. Accordingly, the copying paper feeding speed must be controlled extremely accurately, and the time that a certain point on the copying paper reaches the next thermal head member after passing through one thermal head member must be precisely maintained, in order to obtain the desired multicolor picture by successively printing the same picture in a different color at each thermal head member.

In such a system, each thermal head is driven successively with a time delay which is decided by the distance between each thermal head member and the copying paper feeding speed.

The copying paper feeding is achieved by rotating the platen which is in pressure contact with the thermal head via the copying paper and the ink ribbon. The platen surface is made of soft rubber member. The copying paper and the ink ribbon which contacts the copying paper are fed according to the rotation of the platen by frictionally contacting the rubber member to the copying paper. Therefore, the feeding speed of the copying paper is determined by the rotating speed of the platen at each thermal head member. Actually, however, since the platen surface is made of soft rubber as mentioned above, it is difficult to make the outer diameter of the platen precise predetermined dimension. As a result a color shear in printing occurs because the paper feeding speed differs due to the difference of the outer diameters of the platens, even if the platens at each thermal head member are rotationally driven at the same rotating speed by a single motor. To avoid such drawbacks, it is necessary to use platens of nearly the same outer diameter which need be selected from a group of platens of slightly varying dimensions. It is, however, difficult to select platens of the same outer diameter in order to satisfy the required accuracy since the size of the thermal head heating element is about 100 $\mu m \times 100\ \mu m$.

SUMMARY OF THE INVENTION

Accordingly, it is an object of this invention is to provide a multicolor thermal transfer copying system which eliminates a color shear in multicolor printing caused by the irregularity of the copying paper feeding speed by making the copying paper feeding speed past each thermal head perfectly constant regardless of the outer diameters of the platens for feeding the copying paper.

DESCRIPTION OF THE PREFERRED EMBODIMENT

Figure 1:
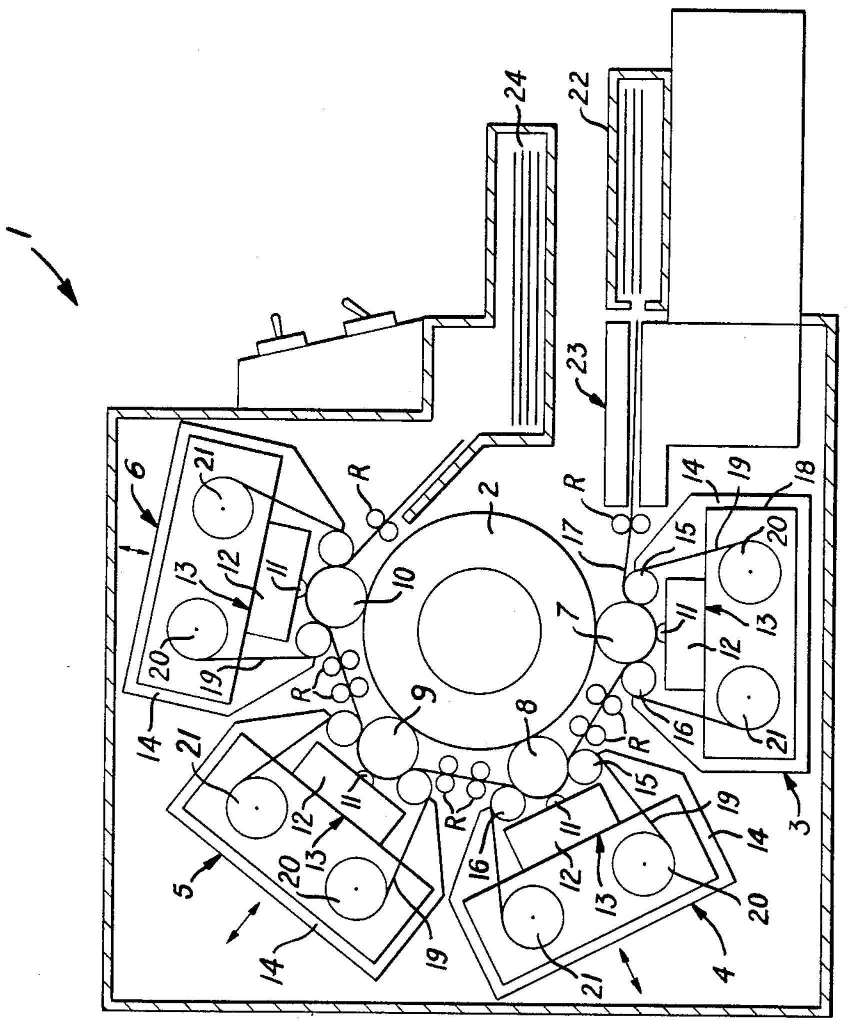
FIG. 1 is a schematic view showing an embodiment of the present invention.

According to this invention the peripheral surface of each platen corresponding to the thermal heads of each thermal head member is in pressure contact with the peripheral surface of one rotary driving member, whereby each platen is rotatably driven directly in proportion to the rotation of the rotary driving member.

FIG. 1 shows a schematic view of the multicolor thermal transfer copying or printing system according to this invention. A thermal transfer copying system 1 has a rotatably mounted cylindrical metal roller 2 and four thermal head members 3, 4, 5, 6 are provided in angularly shaped relation about the periphery of the metal roller 2.

A set of platens 7, 8, 9, 10 are rotatably mounted in facing relation to respective ones of each thermal head member. The platens are made of rubber and have a soft surface, and the platens have cylindrical shapes are supported rotatably to the frame (not shown). The soft rubber surfaces are provided for contacting frictionally to the peripheral surface of the metal roller 2 with proper pressure. The metal roller 2 is connected to a rotary driving source such as a pulse motor (not shown), whereby the metal roller 2 is rotated at a predetermined rotating speed. Accordingly, the metal roller 2 is always rotating at a constant peripheral speed during operation of the system. Since the peripheral surface of each platen 7–10 is in direct frictional contact with the peripheral surface of the metal roller 2, each platen is always rotated at the same peripheral speed as the metal roller 2 according to the rotation of the roller 2.

The thermal head member 3 has a thermal head 13 having a heat resistor 11 aligned on a base plate 12 in the perpendicular direction to the paper, and the thermal head 13 is fixed to a base member 14 which is movably mounted on the frame (not shown) to undergo movement in the arrow mark direction as desired. Two guide rollers 15, 16 are rotatably supported to on the base member 14, and a cassette 18 housing the ink ribbon is located at the rear end portion of the thermal head 13. The guide rollers 15, 16 are contacted with pressure to the platen 7 via a copying paper 17 and an ink ribbon 19 when the heat resistor 11 of the thermal head 13 makes pressure contact with the platen 7 via the copying paper 17 and the ink ribbon 19 in the cassette 18 by moving the base member 14, whereby the copying paper 17 and the ink ribbon 19 are set and contacted tightly on the peripheral surface of the platen 7. In this condition, the copying paper 17 is contacted to the platen 7 frictionally, and thus the copying paper 17 is fed at the same speed as the peripheral speed of the platen 7. At this time, the ink ribbon 19 is fed with the copying paper 17 by the friction of the two and/or the adhesion of resolved ink, and the ink ribbon 19 is wound by a winding reel 21 from a supplying reel 20 in the cassette 18.

The other thermal heads 4–6 are constructed in the same way as the thermal head 3 except for the ink ribbon color and the corresponding portions thereof are marked with the same numerals.

In the drawing, the reference character R shows a couple of rollers for guiding the copying paper 17, numeral 22 is a copying paper cassette for housing the copying paper 17, numeral 23 is a paper feeding mechanism for taking out the copying paper from the copying paper cassette 22 sheet by sheet preferably, and numeral 24 is a support for feeding out paper.

Referring now to the operation of the system, each cassette 18 in the thermal head member 3–6 has respectively an ink ribbon of yellow, magenta, cyan, and black, and these colors are printed at each thermal head member according to the intended copying information.

In the non-printing condition, each base member 14 of the thermal head members 3–6 is respectively detached from each rotating platen 7–10. Accordingly, the copying paper 17 is not fed, and the ink ribbon 19 at each cassette 18 is also not fed.

In the printing condition, the copying paper 17 is fed from the paper feeding mechanism 23, and fed to the thermal head member 3 via the guiding rollers R. In this case, each thermal head member 3–6 is in pressure contact with the corresponding rotating platen 7–10, and the copying paper 17 is fed along the feeding route at the same speed as the peripheral speed of each platen. As mentioned before, since each platen is frictionally contacted directly to the peripheral surface of the metal roller 2, the peripheral speed of each platen always coincides with the peripheral speed of the metal roller 2 regardless of the outer diameter of the platen. Consequently, the copying paper 17 is fed at a constant speed coinciding with the peripheral speed of the metal roller 2. As mentioned above, since the feeding speed of the copying paper 17 can be kept constant in all processes regardless of the outer diameter of the platen, each printing process at the thermal head member can be synchronized definitely, and therefore a multicolor picture without color shear can be obtained.

Although the embodiment of using four differently colored inks has been illustrated, this invention is not limited thereto, and it is to be noted that the present invention is applicable to a multicolor printing which overlaps or superimposes two or more color ink pictures.

Accordingly this invention has the following advantages:

(a) Since the feeding speed of the copying paper relative to each head member can be easily kept constant regardless of the outer diameter of the platen, the platen need not be formed accurately, and a clear multicolor printed picture without color shear can be realized at a low cost.

(b) Since the platens are contacted with pressure to a large diameter roller which is made preferably of metal and the platens are supported by the roller, the diameter of the platens can be minimized even if the pressing force between the head member and the platens is greater. Accordingly, it is possible to reduce the platen diameter and the overall system size without causing color shear in the transfer printing operation.

(c) Since the platens make direct contact with the driving roller, the heat from the thermal heads is transferred to the driving roller via the platens, therefore the heat is never accumulated in the platens, and the deflection of the printing accuracy by the heat accumulation in the platens can be effectively eliminated.

We claim:

1. In a multicolor thermal transfer copying system having plural rotationally driven platens coacting with corresponding thermal heads to frictionally feed a copying paper successively past the thermal heads in conjunction with the feeding of a different color ink ribbon at each thermal head to effect the multicolor thermal transfer printing of a picture on the copying paper: a rotatable metal roller rotationally driven at a predetermined speed of rotation during use of the system; and means mounting the plural platens in angularly spaced relation about the periphery of the metal roller and in direct frictional contact with the peripheral surface thereof such that the platens are all frictionally rotationally driven at the same peripheral speed in response to rotation of the metal roller and the heat generated by the thermal heads is effectively taken off by the metal roller through the platens.

2. A multicolor thermal transfer printing system according to claim 1; wherein the plural platens have rubber surfaces in frictional contact wih the peripheral surface of the metal roller.

3. A multicolor thermal transfer printing system according to claim 1; wherein the plural platens are comprised of rubber.

4. A multicolor thermal transfer printing system according to claim 1; wherein the plural platens comprise four in number.

5. A multicolor thermal transfer printing system according to claim 4; wherein the plural platens have rubber surfaces in frictional contact with the peripheral surface of the metal roller.

6. A multicolor thermal transfer printing system according to claim 1; wherein the plural platens comprise at least three in number.

7. A multicolor thermal transfer printing system according to claim 6; wherein the plural platens have rubber surfaces in frictional contact with the peripheral surface of the metal roller.

8. A multicolor thermal transfer printing system according to claim 1; wherein the metal roller has a cross-sectional diameter several times larger than that of the platens.

* * * * *